(12) United States Patent
Lewin

(10) Patent No.: US 10,981,446 B2
(45) Date of Patent: Apr. 20, 2021

(54) ADJUSTABLE BRACKET FOR ATTACHING A TANK TO THE UNDERSIDE OF A VEHICLE OR TRAILER

(71) Applicant: Transfer Flow, Inc., Chico, CA (US)

(72) Inventor: Robert Lewin, Chico, CA (US)

(*) Notice: Subject to any disclaimer, the term of this patent is extended or adjusted under 35 U.S.C. 154(b) by 342 days.

(21) Appl. No.: 16/192,495

(22) Filed: Nov. 15, 2018

(65) Prior Publication Data

US 2019/0176615 A1 Jun. 13, 2019

Related U.S. Application Data

(60) Provisional application No. 62/588,380, filed on Nov. 19, 2017.

(51) Int. Cl.
| | |
|---|---|
| *B60K 15/06* | (2006.01) |
| *B60K 15/067* | (2006.01) |
| *F02M 37/00* | (2006.01) |
| *B60K 15/03* | (2006.01) |
| *B60K 15/063* | (2006.01) |

(52) U.S. Cl.
CPC ....... *B60K 15/067* (2013.01); *F02M 37/0088* (2013.01); *B60K 2015/03151* (2013.01); *B60K 2015/0638* (2013.01)

(58) Field of Classification Search
CPC ........ B60K 15/067; B60K 2015/03151; B60K 2015/0638; F02M 37/0088
See application file for complete search history.

(56) References Cited

U.S. PATENT DOCUMENTS

| | | | | |
|---|---|---|---|---|
| 5,419,577 | A  * | 5/1995 | Murray | B60P 3/06 280/656 |
| 8,888,059 | B2 * | 11/2014 | Kohberg | B60R 11/00 248/201 |
| 9,908,406 | B2 * | 3/2018 | Rike | B60K 15/07 |
| 2005/0258630 | A1 * | 11/2005 | Choi | B60K 15/067 280/834 |
| 2013/0001384 | A1 * | 1/2013 | Karlsson | B60K 15/067 248/214 |
| 2013/0334381 | A1 * | 12/2013 | Vargo, Jr. | B60K 15/07 248/201 |
| 2014/0103628 | A1 * | 4/2014 | De Biasi | B60P 3/22 280/834 |
| 2017/0101003 | A1 * | 4/2017 | Zimmerman | F16F 15/04 |

FOREIGN PATENT DOCUMENTS

FR 2678881 A1 * 1/1993

* cited by examiner

*Primary Examiner* — Jacob D Knutson
*Assistant Examiner* — Marlon A Arce

(57) ABSTRACT

This invention provides an adjustable bracket that can be used to attach auxiliary fuel tanks and other tanks to the bottom of a trailer or vehicle. The adjustable nature of the bracket allows it to be used on a variety of trailers, with different widths. The adjustable bracket comprises two parts with one sliding inside of the other. Each part has several slots that can be lined to create a bracket that is the ideal length to span the distance between the side panels of a trailer or vehicle. The bracket has holes in the bottom through which the bracket can be attached to a mounting retainer or strap that holds the tank in place.

14 Claims, 4 Drawing Sheets

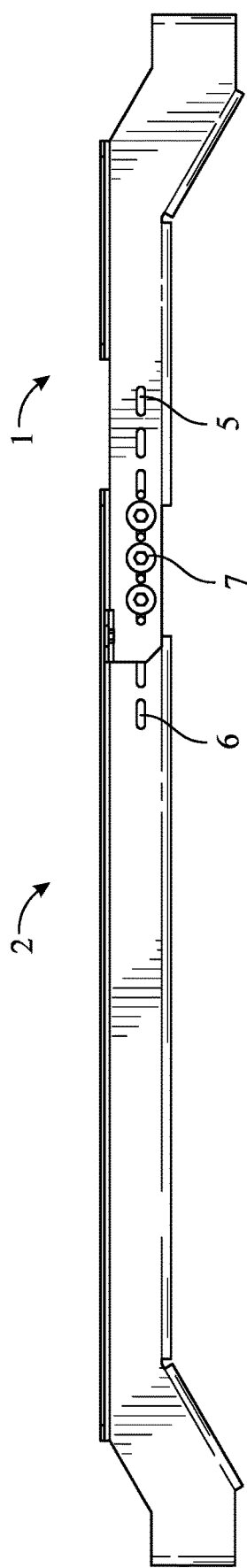
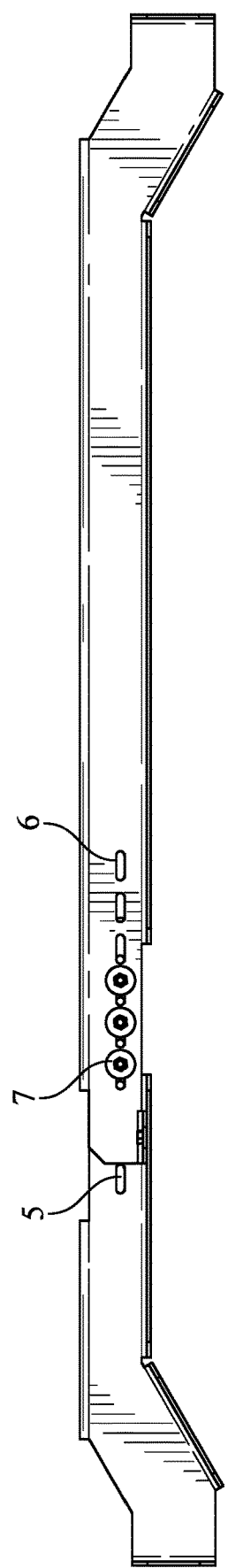
FIG. 3
FIG. 4

ADJUSTABLE BRACKET FOR ATTACHING A TANK TO THE UNDERSIDE OF A VEHICLE OR TRAILER

CROSS REFERENCE TO RELATED APPLICATIONS

This application claims priority back to U.S. Provisional No. 62/588,380, entitled Adjustable Bracket for attaching a tank to the underside of a vehicle or trailer, with a filing date of 19 Nov. 2017, the contents of which are incorporated by reference.

STATEMENT REGARDING FEDERALLY SPONSORED RESEARCH OR DEVELOPMENT

This invention was not federally sponsored.

BACKGROUND OF THE INVENTION

Field of the Invention

This invention relates to the general field of trailers and tanks that are attached to the bottom of a vehicle or trailer, such as auxiliary fuel tanks and gray, black and fresh water tanks. The invention is more particularly directed to an adjustable bracket that spans the bottom of a trailer or vehicle from one side to the other and can be used to secure auxiliary fuel tanks or other tanks to the trailer or vehicle.

Statement of the Problem Solved

The problem of bringing extra fuel has long perplexed humans. Since stopping at a gas station to refuel a car of truck is among the least popular parts of a drive, there is considerably prior art relating to installing auxiliary fuel tanks on vehicles and trailers so that the driver does not have to stop so often to refuel. An additional problem has been how to bring along extra water, and how to store "used" water before finding a suitable dumping station. Thus, the advent of water tanks for gray, black and freshwater solved this problem.

Attaching auxiliary fuel tanks and other tanks to vehicles and trailers is well known, but a frequent problem is that different vehicles and trailers have different widths, thereby requiring a specific length of a bracket to fit between the sides of the vehicle or trailer to secure the auxiliary fuel tank to the body of the vehicle or trailer.

Thus, many "vehicle-specific" and "width-specific" brackets have been created.

However, none of the prior art offers a single bracket that is adjustable such that it can fit on a variety of vehicles and trailers with different widths between their two sides.

The current invention provides just such a solution by having a two-part bracket, with a "second part" creating a trough through which a "first part" slides. Both parts have slots which can be lined up at the correct distance for that particular vehicle or trailer, and bolted together to create a bracket with the specific length needed to bridge the gap between the two sides. The bracket also has a series of holes that can be used to attach the mounting retainers used to secure auxiliary fuel tanks, water tanks, and other tanks to vehicles.

There has thus been outlined, rather broadly, the more important features of the invention in order that the detailed description thereof may be better understood, and in order that the present contribution to the art may be better appreciated. There are additional features of the invention that will be described hereinafter and which will form the subject matter of the claims appended hereto. The features listed herein and other features, aspects and advantages of the present invention will become better understood with reference to the following description and appended claims.

BRIEF DESCRIPTION OF THE FIGURES

The accompanying drawings, which are incorporated in and form a part of this specification, illustrate embodiments of the invention and together with the description, serve to explain the principles of this invention.

FIG. 3 is a front view thereof.
FIG. 4 is a back view thereof.

DETAILED DESCRIPTION OF THE INVENTION

Figure 1:
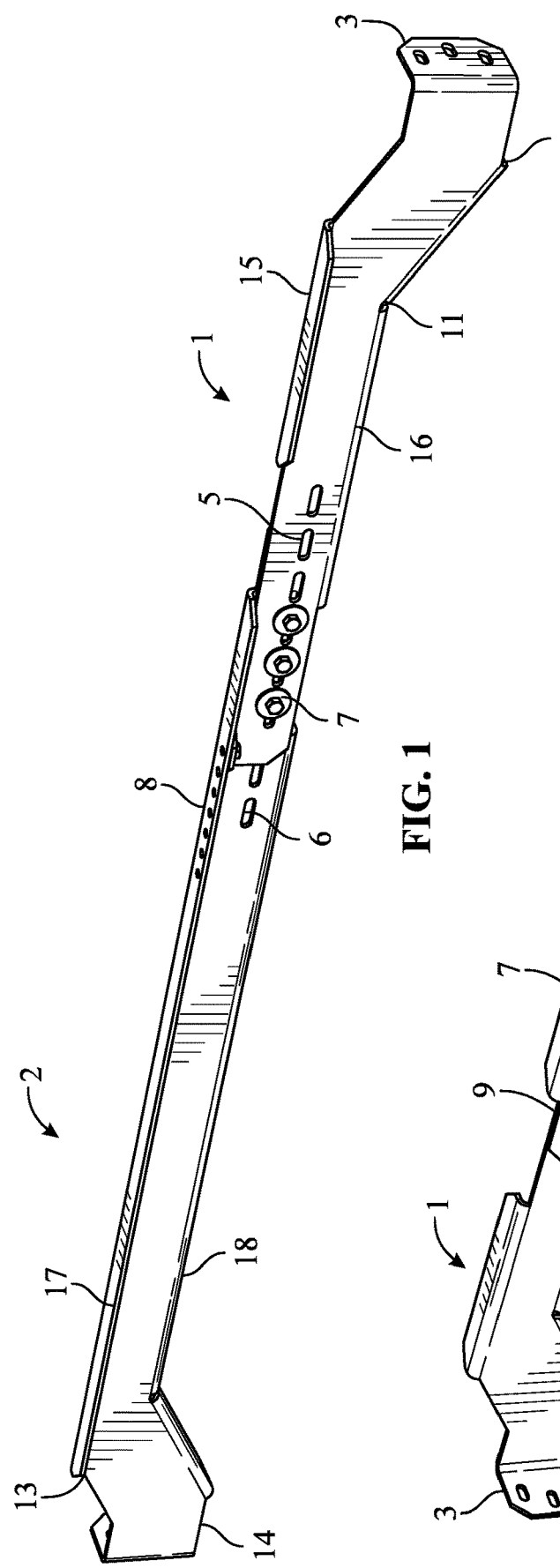
FIG. 1 is a perspective, front view of an adjustable trailer bracket.

Many aspects of the invention can be better understood with the references made to the drawings below. The components in the drawings are not necessarily drawn to scale. Instead, emphasis is placed upon clearly illustrating the components of the present invention. Moreover, like reference numerals designate corresponding parts through the several views in the drawings. For purposes of these figures and description, an auxiliary fuel tank is used. However, the technology described herein is equally applicable to other tanks that are attached to the bottom of a vehicle or trailer, such as gray, black, and fresh water tanks.

FIG. 1 is a perspective, front view of an adjustable trailer bracket for attaching an auxiliary fuel tank to a trailer. The basic unit comprises a front part 1, a back part 2, one or more adjustment bolts 7, and a securing bolt 10. The first part 1 is a roughly rectangular piece that has been crimped over at the top and bottom to create a first part upper flange 15 and a first part lower flange 16. A first part first bend 11 and a first part second bend 12 serve to offset a mounting bracket 3 from the general plane of the first part. There are multiple first part slots 5 through which adjustment bolts 7 can be inserted and used to adjustably secure the first part 1 to the second part 2.

The second part 2 is also a roughly rectangular piece of metal that has been crimped over at the top and bottom to create a second part upper flange 17 and a second part lower flange 18. A second part first bend 13 and a second part second bend 14 serve to offset a mounting bracket 3 from the general plane of the second part. There are multiple second part slots 6, which can be aligned with the first part slots 5, through which adjustment bolts 7 can be inserted and used to adjustably secure the second part 1 to the first part 2.

This way, the users of the invention can decide how far wide a distance from one side of the trailer body to the other, and line up the first part slots 5 with the proper second part slots 6 to create the desired overall distance, and use adjustment bolts 7 to temporarily secure the first part 1 to the second part 2.

On the second part 2, the second part lower flange 18 has a second part securing bracket 8, which has a number of holes that match up with similar sized holes in a first part securing bracket 9, which is part of the first part lower flange 16. To further secure the first part 1 and the second part 2 at the desired distance, a securing bolt is attached at one of the holes in the first part securing bracket 9 that has been lined up with a similar sized hole in the second part securing bracket 8.

The flanges on both the first part 1 and the second part 2 serve to provided additional strength to the invention, as well as provided the bases for the securing brackets. The flanges on the second part are farther apart than the flanges on the first part, thereby creating a channel in which the first part can slide to facilitate lining up of the first part slots 5 and the second part slots 6.

Figure 2:
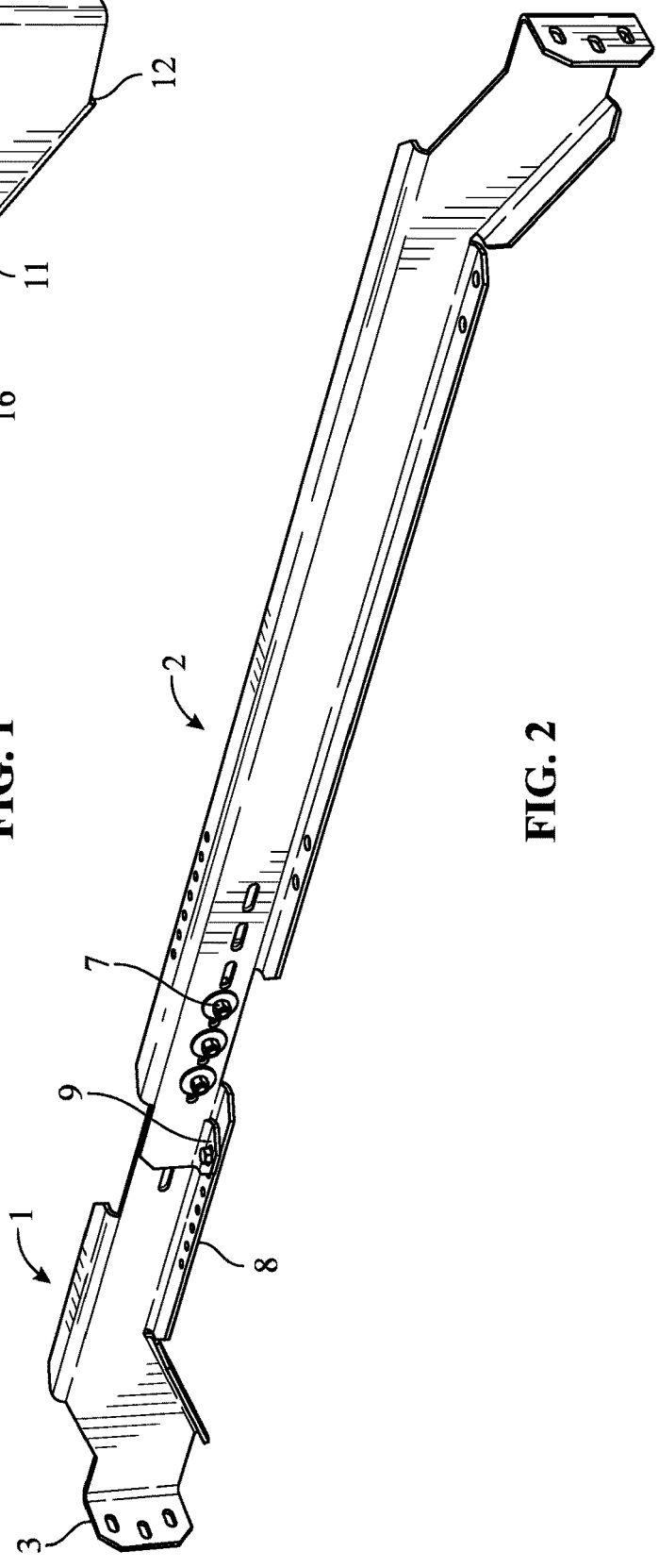
FIG. 2 is a back, perspective view thereof.
Figure 6:
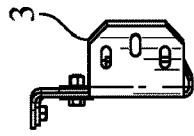
FIG. 6 is a right-side view thereof.
Figure 7:
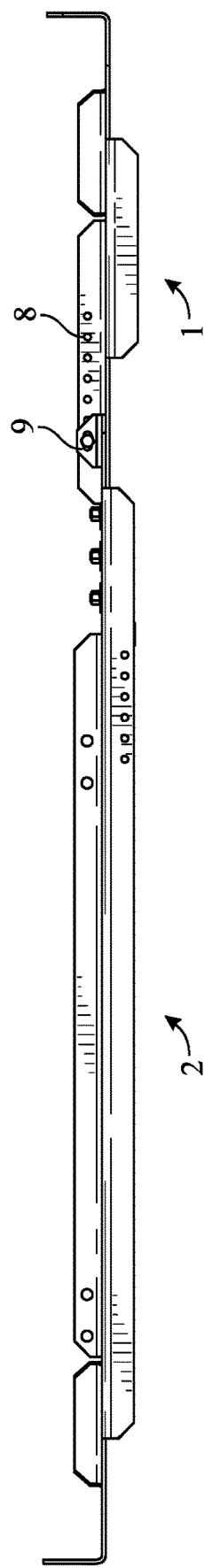
FIG. 7 is a top view thereof.
Figure 8:
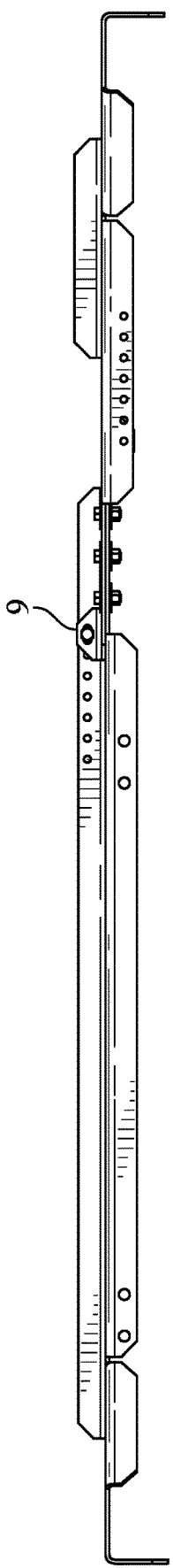
FIG. 8 is a bottom view thereof.
Figure 5:
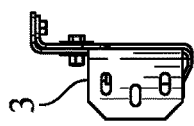
FIG. 5 is a left-side view thereof.
Figure 9:
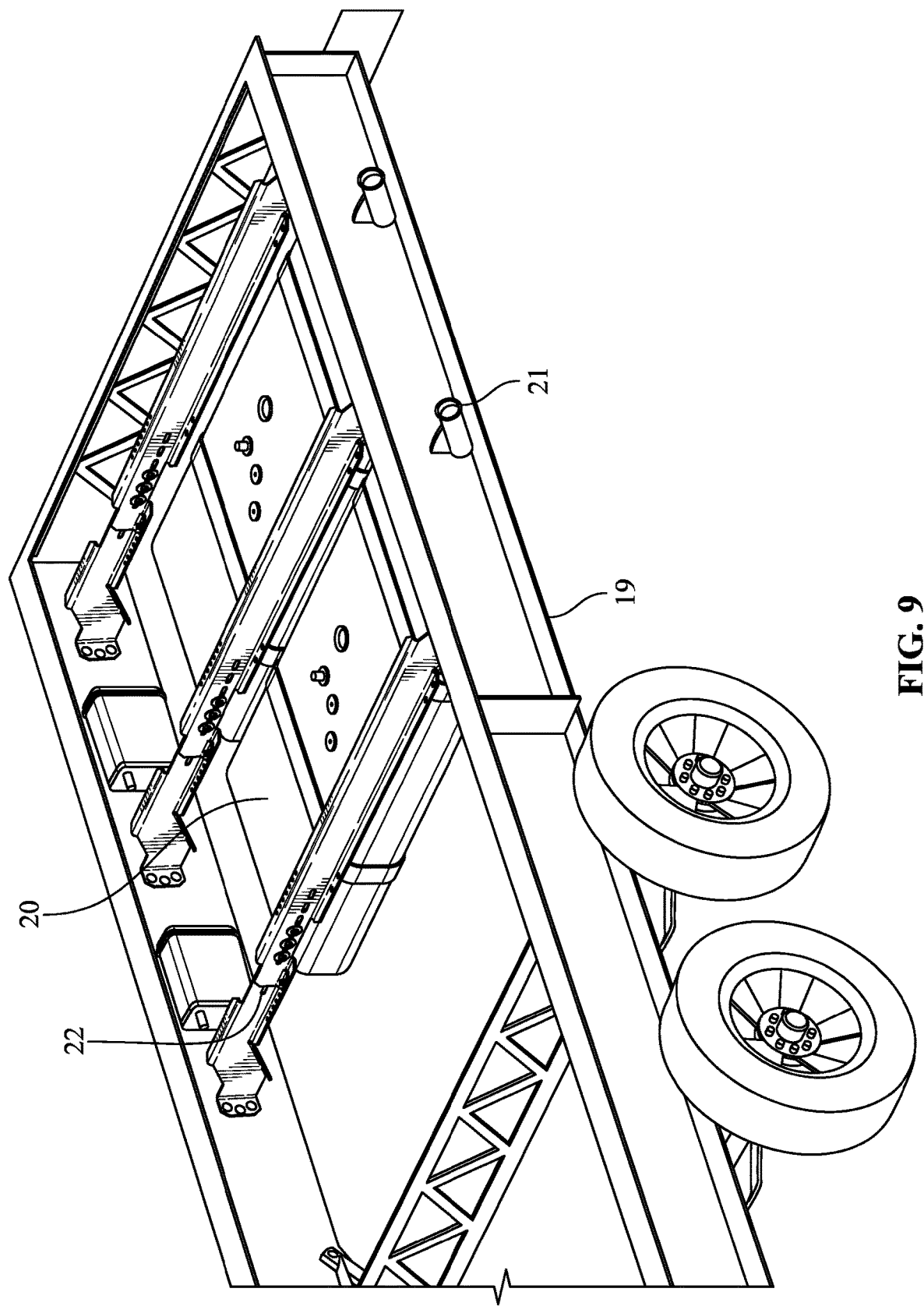
FIG. 9 is a perspective, top view of the several of the inventions in place to hold auxiliary fuel tanks in place.

FIG. 2 is a back, perspective view thereof.
FIG. 3 is a front view thereof.
FIG. 4 is a back view thereof.
FIG. 5 is a left-side view thereof.
FIG. 6 is a right-side view thereof.
FIG. 7 is a top view thereof.
FIG. 8 is a bottom view thereof.
FIG. 9 is a perspective, top view of the several of the inventions in place to hold auxiliary fuel tanks in place. The trailer has side panels 19 that are set different spaces apart depending on the trailer. The fuel tanks 20 need to be secured between the side panels 19. Two mounting retainers 23 or straps are used to encircle the fuel tanks 20. These mounting retainers 23 are attached to the invention, generally referenced as 22, through the holes in the first part and the second part of the invention. By changing the lining up of the first part slots and the second part slots, the invention can be adjusted to fit trailers of different widths.

Again, the above description of the invention described how it would work with an auxiliary fuel tank, but the technology is equally applicable to other tanks frequently attached to the bottom of vehicles and trailers, such as gray, black and fresh water tanks.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

REFERENCE NUMBERS USED

1. First part
2. Second part
3. Mounting brackets
4. Adjustment bracket
5. First part slots
6. Second part slots
7. Adjustment Bolt
8. Second part securing bracket
9. First part securing bracket
10. Securing bolt
11. First part first bend
12. First part second bend
13. Second part first bend
14. Second part second bend
15. First part upper flange
16. First part lower flange
17. Second part upper flange
18. Second part lower flange
19. Trailer sides
20. Auxiliary fuel tank
21. Filler hose
22. Invention, generally
23. Mounting retainer or strap

What I claim is:

1. An adjustable bracket for attaching a tank to the underside of a vehicle or trailer, comprising: a first part and a second part, where the first part slides freely within at least a part of the second part, and additionally comprising two mounting brackets by which the adjustable bracket can be attached to the underside of a vehicle or trailer, and additionally comprising at least one hole to which a mounting retainer can be attached, where the mounting retainer holds a tank in place, where each of the two mounting brackets attaches to a side panel of the underside of a vehicle or trailer, where one or more overlapping sections of the first part and the second part form an adjustment bracket, where the second part additionally comprises one or more second part slots, and where the first part additionally comprises one or more first part slots, wherein the adjustable bracket is adapted to be extended by a user from one side of the vehicle or trailer to the other, and lines up one of the at least one second part slots with one of the at least one first part slots, additionally comprising an adjustment bolt, where the adjustment bolt is installed at a location of the intersection where the user lines up one of the at least one second part slots with one of the at least one first part slots, where the first part additionally comprises a first part first bend, and the second part additionally comprises a second part first bend.

2. The adjustable bracket of claim 1, where the first part additionally comprises a first part second bend and the second part additionally comprises a second part second bend.

3. The adjustable bracket of claim 2, where the first part first bend, the first part second bend, the second part first bend, and the second part second bend create a non-linear configuration which absorbs slight changes to the distance between the side of the vehicle or trailer.

4. The adjustable bracket of claim 3, where the first part additionally comprises a first part upper flange and a first part lower flange.

5. The adjustable bracket of claim 4, where the second part additionally comprises a second part upper flange and a second part lower flange.

6. The adjustable bracket of claim 5, where the first part upper flange, the first part lower flange, and second part upper flange, and the second part lower flange are at an angle of approximately 90 degrees from a main body of the first part and a main body of the second part.

7. The adjustable bracket of claim 6, where the first part lower flange additionally comprises a first part securing bracket, and where the second part lower flange additionally comprises a second part securing bracket, and where the first part securing bracket and the second part securing bracket have one or more holes.

8. The adjustable bracket of claim 7, where at least one of the one or more holes in the first part securing bracket and at least one of the one or more holes in the second part securing bracket can be lined up at a second intersection.

9. The adjustable bracket of claim 8, where a securing bolt can be inserted at the intersection, and the securing bolt attaches the mounting retainer, thereby attaching the tank to the vehicle or trailer.

10. The adjustable bracket of claim 9, where there are two or more intersections, and where the user of the invention can use two or more securing bolts to attach the mounting retainer to the tank.

11. The adjustable bracket of claim 10, where the tank is an auxiliary fuel tank.

12. The adjustable bracket of claim 10, where the tank is a fresh water tank.

13. The adjustable bracket of claim 10, where the tank is a gray water tank.

14. The adjustable bracket of claim 10, where the tank is a black water tank.

* * * * *